June 10, 1930.  J. BARRY  1,763,126
COOKER
Filed March 16, 1929   2 Sheets-Sheet 1
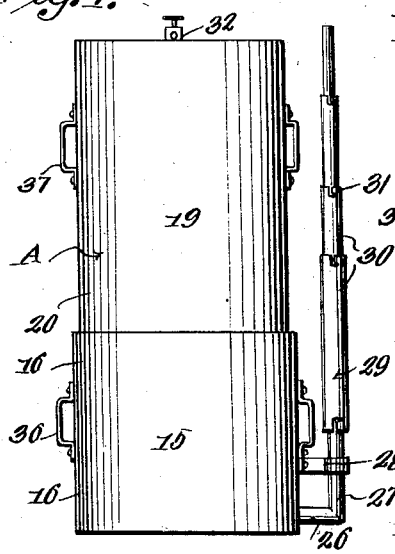
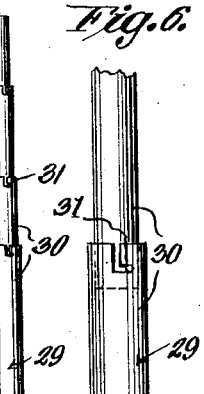
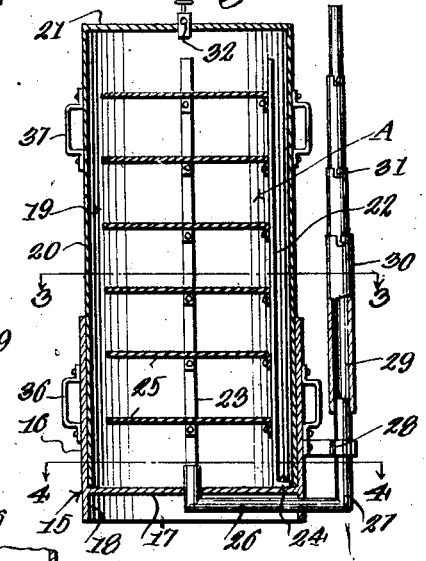
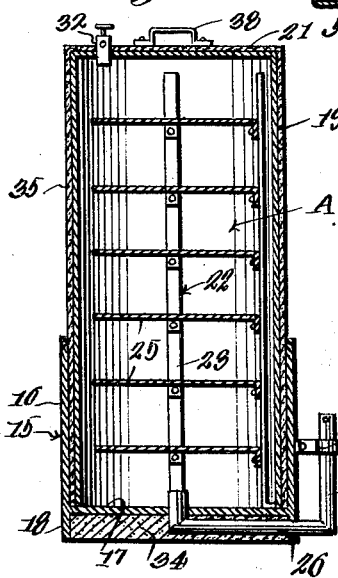
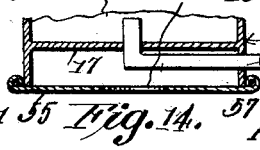
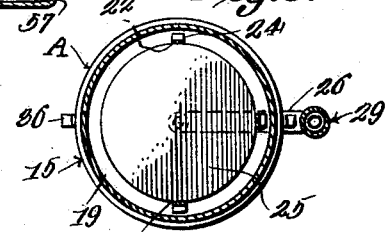
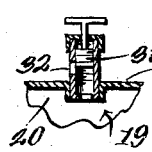
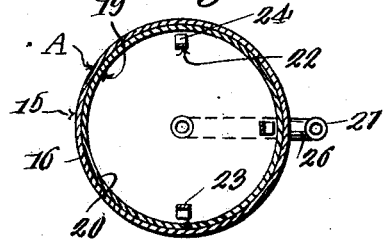
WITNESSES
INVENTOR.
JERRY BARRY
BY
ATTORNEYS.

June 10, 1930.  J. BARRY  1,763,126
COOKER
Filed March 16, 1929   2 Sheets-Sheet 2
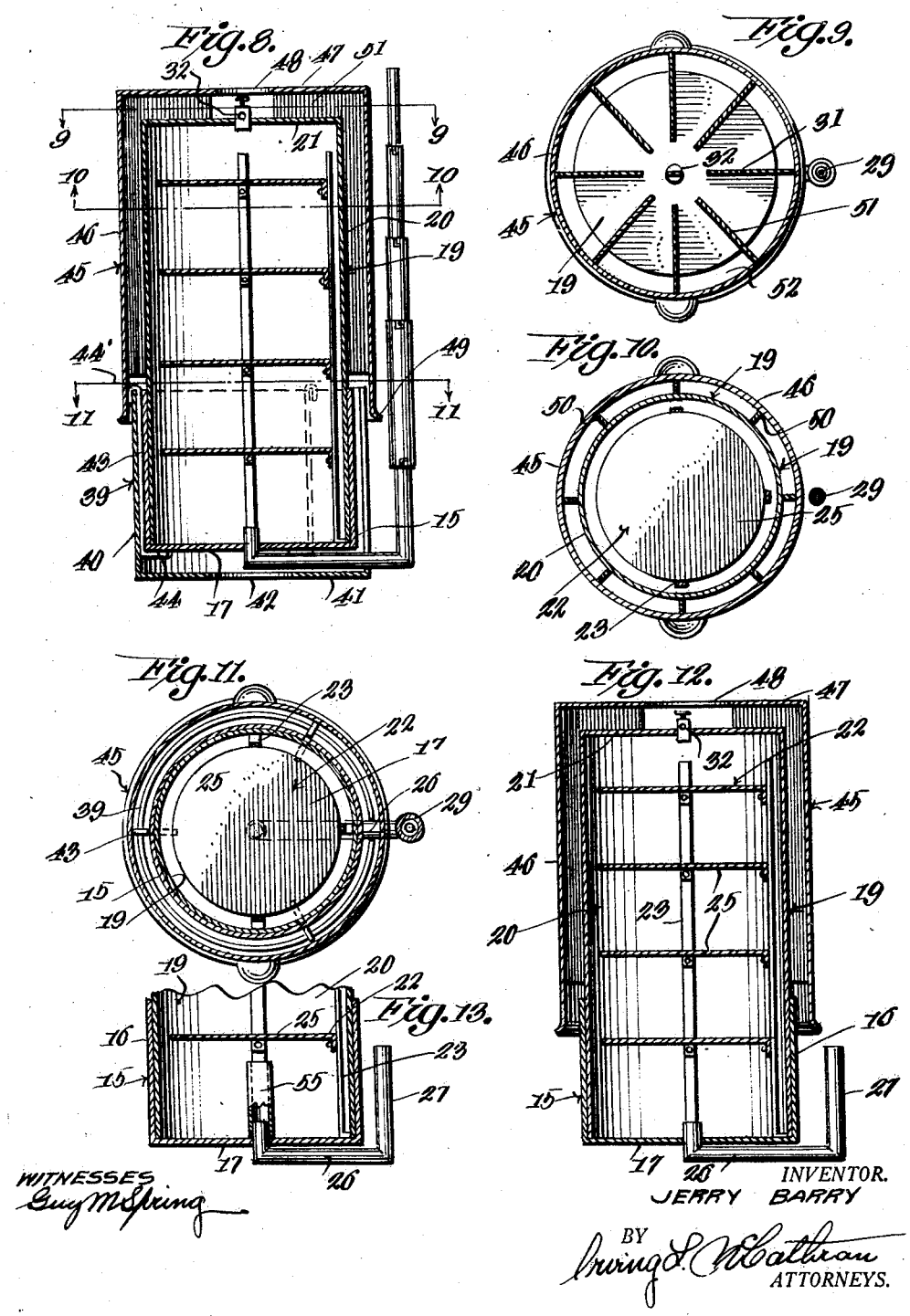
INVENTOR.
JERRY BARRY
BY
ATTORNEYS.

Patented June 10, 1930

1,763,126

UNITED STATES PATENT OFFICE

JERRY BARRY, OF MELFORT, SASKATCHEWAN, CANADA

COOKER

Application filed March 16, 1929. Serial No. 347,625.

This invention relates to improvements in cooking devices and more particularly to a novel means for cooking food stuff in a closed vessel without the use of water or the like and is a continuation in part of my application Serial No. 282,709, filed June 4, 1928, which is hereby abandoned in favor of this present case.

A salient object of my invention is the provision of a domestic cooking vessel embodying a sectional cooking chamber including a lower receptacle or a main body and a cover telescopically and slidably mounted within the receptacle, the receptacle and cover receiving any preferred type of rack for supporting the food stuff to be cooked.

Another important object of my invention is the provision of a novel outlet for the cooker, said outlet communicating with the lower end of the cooker and being so arranged as to control the amount of moisture within the cooker, whereby the cooker can be readily adapted for cooking various kinds of food stuff.

A further object of the invention is the provision of a domestic cooker having an outlet at the lower end thereof for the cold air and vapor with a sectional pipe for connection with the outlet, the sections of the pipe being so arranged as to permit the active length of the pipe to be readily altered, so that the desired amount of moisture can be allowed to flow from the cooker, thereby permitting effective browning of the food stuff when desired.

A further object of the invention is the provision of a novel vent carried by the cover of the cooker to permit the initial escape of cold air from the cooker at the start of the use thereof, the vent being so constructed as to permit a graduated closing thereof.

A further object of the invention is the provision of novel means for constructing the cooker so as to permit the conservation of heat, the cooker embodying novel means for permitting the flow of heat around and over the entire cooking vessel.

A still further object of the invention is to provide an improved cooking device of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed, and illustrated in the accompanying drawing, in which drawing:

Figure 1 is a side elevation of my improved cooker;

Figure 2 is a central vertical section through the improved cooker;

Figure 3 is a horizontal section through the cooker taken on the line 3—3 of Figure 2 looking in the direction of the arrows;

Figure 4 is a horizontal section through my improved cooker taken on the line 4—4 of Figure 2 looking in the direction of the arrows;

Figure 5 is an enlarged fragmentary vertical section through the upper end of the cooker illustrating the novel graduated vent for the cooker;

Figure 6 is an enlarged fragmentary side elevation of the outlet pipe showing one type of joint which can be employed therefor;

Figure 7 is a central vertical section through a slightly modified form of the cooker showing the means employed for holding the heat within the cooker;

Figure 8 is a central vertical section through a still further modified form of the cooker illustrating the novel means employed for distributing the heat around the cooker;

Figure 9 is a horizontal section through the cooker taken on the line 9—9 of Figure 8 looking in the direction of the arrows;

Figure 10 is a similar section through the cooker taken on the line 10—10 of Figure 8 looking in the direction of the arrows;

Figure 11 is a horizontal section through the cooker taken on the line 11—11 of Figure 8 looking in the direction of the arrows;

Figure 12 is a central vertical section through the cooker showing the outer shell for the body portion of the cooker removed;

Figure 13 is a central fragmentary vertical section through the lower end of the cooker with the extension pipe connected with the lower outlet for permitting the cooker to be used with water or the like to form a steamer.

Figure 14 is a vertical section of the lower portion of the lower receptacle.

Referring to the drawings in detail, wherein similar reference characters designate corresponding parts throughout the several views, the letter A generally indicates one form of my improved cooker, which can comprise a lower receptacle 15, which in the present instance has been shown to consist of a cylindrical side wall 16 and a bottom wall 17. As shown the bottom wall 17 is slightly spaced from the lower marginal edge of the side wall so as to form a spacing flange 18, whereby the cooker can be placed directly upon a stove or burner. The receptacle 15 can be constructed of any desired material, such as aluminum, heavy sheet metal or the like.

In connection with the lower receptacle 15, I utilize an upper container or cover 19, which can also be constructed from any desired material, such as aluminum, sheet metal or the like and this cover includes a cylindrical side wall 20 and a circular top wall 21. This side wall 20 is adapted to snugly fit within the lower receptacle 15, as clearly shown in Figure 4 of the drawings, and it can also be seen that when the cover is associated with the lower receptacle a completely closed cooking vessel will be had.

Arranged within the lower receptacle 15 is a removable rack 22 for supporting the food stuff to be cooked within the cooker. The rack 22 can be of any desired form or construction, which is best suited for the purpose, and in the present instance, I have shown the same to embody spaced vertical legs 23, which can be formed of strap iron, if so desired. The lower ends of these legs can be bent at right angles to provide supporting feet 24 and the legs at equidistantly spaced points can receive shelves 25, which are secured to the legs 23 in any preferred way. These shelves 25 are adapted to receive the food to be cooked.

If preferred, the shelves can be made adjustable on the legs, so that different sizes of cooking utensils can be conveniently placed thereon. It is to be noted that when the rack is placed within the lower receptacle 15, the same is spaced from the side wall thereof and protrudes above the same a considerable distance, but that the rack is adapted to be completely housed, when the cover 19 is placed in position.

One of the salient features of my invention is the arrangement of the novel outlet for the cooker and by my arrangement of this outlet, the cooking of the food can be readily controlled. This outlet embodies a bottom tube or pipe 26, which can communicate with the diametric center of the lower vessel 15, through the bottom wall 17 thereof. This bottom pipe or tube 26 can be extended through the flange 18, if found desirable, and can be provided with an upstanding vertical leg 27, which can be rigidly secured to the side wall 16 of the lower vessel 15 by suitable brackets 28, if found desirable.

In connection with the lower pipe 26, I provide a vertical outlet pipe 29, which, in accordance with this invention, embodies a plurality of sections 30, whereby the active length of the pipe can be altered to suit various cooking conditions. These sections 30 may be connected together in any desired way, such as by the use of bayonet joints 31.

Particular attention is invited to the arrangement of the vertical pipe 29, due to the fact that the length thereof can be altered, as I have found by actual experiment that the length of the vertical pipe controls the cooking of the food stuff.

The outlet pipe allows the cold air to be vented from the cooker and under normal cooking conditions for food stuffs, such as vegetables and meat, several sections of the pipe should be removed so that the pipe will terminate short of the upper end of the cooker. This will allow the retaining of the moisture within the cooker, and when it is desired to permit the browning of food stuffs, sections are added to the pipe, so that the pipe will extend above the cooker, which will permit the taking of all of the moisture out of the cooker and thereby give a dry heat for browning purposes.

The top wall 21 of the dome or cover 19 can also be provided with an outlet or vent 32, which can be initially used for permitting the escape of cold air from the cooker at the start of the use thereof. This vent can be partly closed or fully closed by the use of a threaded valve plug 33.

The cooker can be made in different ways for different purposes and in Figure 7 I have shown my cooker constructed along the principle of the so-called fireless cooker.

In this form, I prefer to build the same with the lower wall 17 and the flange 18 of a suitable heat retaining material, such as soapstone, fire clay, asbestos cement, or the like 34 and if desired, the cover or top section 19 can be provided with a shell 35 of insulating material so as to retain the heat within the cooking vessel. In all other respects, the cooker is constructed the same as in the first form and in the use of this form of cooking vessel, the same can be placed directly upon the stove and after the same has been thoroughly heated, the flame can be turned off and the cooker will function the same as the ordinary fireless cooker.

Any desired type of handles can be utilized in connection with my cooker and in Figures 1 and 2 I have shown the lower vessel 15 provided with side handles 36 and the top section 19 with similar side handles 37. In Figure 7

I have shown the top or cover section 19 provided with a handle 38 carried by the top wall 21. In cases where the cooker is built in large sizes for hotel or restaurant use, mechanical means can be provided for raising and lowering the cover.

In Figures 8 to 12 inclusive I have illustrated the novel means of forming my cooker so as to conserve heat and to also direct the heat entirely around and over the cooker. In this instance, the lower section or receptacle 15 can be provided with an outer spaced shell 39 formed of sheet metal and including a cylindrical side wall 40 and a bottom disc-shaped wall 41 having a central heat inlet opening 42. Any desired means can be provided for connecting the outer shell 39 with the receptacle 15 and if preferred spacing rods 43 can be utilized for this purpose. These rods 43 can be placed at spaced points around the receptacle 15 with the lower supporting feet 44 thereof in engagement with the bottom wall 17 of the receptacle. The upper ends of the rods can be provided with hooked terminals 44' for engaging over the outer shell 39.

The cover or upper section 19 can likewise be provided with an outer spaced shell 45 including a cylindrical side wall 46 of less length than the side wall 20 and a top disc-shaped wall 47 having a central heat escape opening 48 which is preferably disposed directly above the upper outlet vent 32. The lower end of the side wall 46 of the outer shell 45 is preferably flared as at 49 to facilitate the insertion thereof over the outer lower shell 39. I prefer to space the outer upper shell 45 from the cover 19 by the use of equidistantly spaced spacing plates 50, which plates extend between the outer shell 45 and the cover 19 and connect the same together. The plates 50 also extend between the top wall 21 of the cover 19 and the top wall 47 of the outer shell 45 as indicated by the reference character 51. These extensions 51 of the plates 50 terminate short of the axial center of the top wall as clearly shown in Figure 9. These spacing plates 50 with their extensions 51 define heat channels 52. In the use of this type of cooker, the heat will flow into the lower shell 39 through the opening 42 and circulate between the receptacle 19 and its outer shell, thence upwardly through the channels 52, over the cooker and out of the opening 48. By this method the heat will be confined around the cooker and will insure the uniform heating thereof throughout its entire area.

As shown in Figure 12 of the drawings, the lower outer shell 39 in certain instances can be eliminated, in which case the heat arising from the burner or stove will be collected by the top shell 35 and the heat will flow between the shell 45 and the cover 19 and over the cover and out of the opening 48. By this arrangement the heat will also be conserved and directed over and around the cooker.

My cooker has been particularly arranged so as to eliminate the use of water during the cooking operation and is essentially of the waterless type, the food stuffs themselves supplying sufficient moisture to permit the effective cooking thereof. However, the cooker can be used as a steamer, if desired, in which instance water is placed within the lower receptacle 15. When water is placed within the cooker I prefer to use an extension 55' for the central lower exit pipe 26, as clearly shown in Figure 13 of the drawings. This extension is freely removable and can be removed from or placed on the pipe 26 as needed.

A disk 55 can be used in connection with the cooker A, as shown in Figure 14, when the cooker is used on a gas, gasoline or oil stove for conserving and confining the heat about the cooker. The disk 55 is independent of the cooker and is placed directly over the stove burner and the cooker is then seated on the disk, the disk being provided with an annular wire reinforced rim 57 for receiving the lower edge of the cooker. At the axial center of the disk, the same is provided with an opening 56 for the free admittance of heat to the cooker.

By having the pipe or flue 29 adjustable to different heights, the moisture in the cooker can be controlled, as herebefore stated, due to the fact that the height of the pipe will determine the height of the moisture in the cooker, in that the moisture will be substantially at the same level in the cooker as the top of the flue or pipe. Thus, when it is desired to cook by dry heat for browning purposes, the pipe or flue is extended above the cooker which will draw all the moisture therefrom.

Changes in details may be made without departing from the spirit or the scope of this invention, but:

What I claim as new is:

1. A cooking device comprising a closed vessel, means for controlling the outlet of moisture from said vessel including a flue communicating with the lower end of the receptacle, and means for altering the active length of said flue.

2. A cooking device comprising a lower vessel, a cover for said vessel adapted to be snugly received in the same and extending above said vessel an appreciable distance, a food supporting rack adapted to be housed within said vessel and cover, and a flue communicating with the lower end of the vessel, said flue embodying a plurality of different removable sections, whereby the active length of said flue can be altered.

3. A cooking device comprising a lower vessel, a cylindrical cover for said vessel adapted to be snugly received within the same, a support for food stuffs adapted to be housed within the vessel and cover, an outlet pipe communicating with the lower end of the vessel, and a flue connected with said pipe and extending vertically along the vessel and top, and means for altering the active length of said flue, as and for the purpose specified.

4. A cooking vessel comprising a lower receptacle embodying a side wall and a bottom wall, a depending flange extending below the bottom wall, a cover including a side wall and a top wall, the side wall being adapted to be snugly received within the lower receptacle, a rack for supporting food stuffs adapted to be housed within said receptacle and cover, an outlet flue communicating with the lower end of the receptacle and extending vertically along the vessel and cover, and heat retaining means confined between said flange and bottom wall, as and for the purpose specified.

5. A cooking device comprising a closed vessel, means for controlling the outlet of moisture from said vessel including a flue communicating with the extreme lower end of the receptacle, means for altering the active length of said flue, and a graduated vent carried by the extreme upper end of the vessel for permitting the initial escape of cold air from the vessel.

6. A cooking device comprising a lower vessel, a cover for said vessel adapted to snugly fit within the same, a food supporting rack housed within said vessel and cover, an outlet for the vessel, and an outer shell for the cover of said vessel arranged in spaced relation thereto for receiving the upper end of the vessel and terminating short thereof, as and for the purpose specified.

7. A cooking device comprising a lower vessel, a cover for said vessel adapted to snugly fit within the same, a food supporting rack housed within said vessel and cover, an outlet for said vessel, and a heat distributing shell carried by the cover arranged in spaced relation thereto including a side wall and a top wall, the top wall having a heat escape opening therein, the lower edge of the side wall receiving the receptacle and terminating short of the lower end thereof and arranged in spaced relation to the side wall thereof.

8. A cooking device comprising a lower vessel, a cover for said vessel adapted to snugly fit within the same, a food supporting rack housed within said vessel and cover, a flue having communication with the lower end of said vessel, a vent for the upper end of said vessel, a heat distributing shell arranged in spaced relation to the cover including a side wall and a top wall, the top wall having a heat escape opening therein, spacing plates arranged between the shell and cover defining heat channels, said plates terminating short of the heat escape opening, the lower end of the shell receiving the upper end of the vessel and being arranged in spaced relation to the side wall thereof.

9. A cooking device comprising a lower vessel, a cover for said vessel adapted to snugly fit within the same, a food supporting rack housed within said vessel and cover, a flue having communication with the lower end of said vessel, a vent for the upper end of said vessel, a heat distributing shell arranged in spaced relation to the cover including a side wall and a top wall, the top wall having a heat escape opening therein, spacing plates arranged between the shell and cover defining heat channels, said plates terminating short of the heat escape opening, the lower end of the shell receiving the upper end of the vessel and being arranged in spaced relation to the side wall thereof, and a heat distributing shell carried by the vessel including a side wall and a bottom wall, the bottom wall having a central heat entrance opening.

10. A cooking vessel comprising a lower vessel, a cover for said vessel adapted to snugly fit within the same, a food supporting rack housed within said vessel and cover, a flue having communication with the extreme lower end of said vessel, and a removable extension arranged to receive the inner end of the flue communicating with the lower end of the vessel.

In testimony whereof I affix my signature.

JERRY BARRY.